United States Patent
Chen (10) Patent No.: US 9,805,298 B2
(45) Date of Patent: Oct. 31, 2017

(54) WRIST WORN RFID DEVICE WITH SECURITY PROTECTION AND METHOD THEREOF

(71) Applicant: MITAC COMPUTING TECHNOLOGY CORPORATION, Hsinchu (TW)

(72) Inventor: Min-Chih Chen, Hsinchu (TW)

(73) Assignee: MITAC COMPUTING TECHNOLOGY CORPORATION, Hsinchu (TW)

( * ) Notice: Subject to any disclaimer, the term of this patent is extended or adjusted under 35 U.S.C. 154(b) by 171 days.

(21) Appl. No.: 14/873,850

(22) Filed: Oct. 2, 2015

(65) Prior Publication Data

US 2017/0099276 A1    Apr. 6, 2017

(51) Int. Cl.
| | |
|---|---|
| H04L 29/06 | (2006.01) |
| G06K 19/07 | (2006.01) |
| G06K 19/077 | (2006.01) |
| H04W 12/06 | (2009.01) |

(52) U.S. Cl.
CPC ... *G06K 19/0723* (2013.01); *G06K 19/07762* (2013.01); *H04W 12/06* (2013.01)

(58) Field of Classification Search
CPC .............. H04L 63/08; G06K 7/10366; G06K 19/0723; G06K 19/07762; H04W 12/06
See application file for complete search history.

(56) References Cited

U.S. PATENT DOCUMENTS

| | | | | |
|---|---|---|---|---|
| 6,487,540 B1* | 11/2002 | Smith | ............... | G06Q 20/02 |
| | | | | 705/21 |
| 7,571,468 B1* | 8/2009 | Williams | ............... | G06F 21/34 |
| | | | | 713/184 |
| 8,896,526 B1* | 11/2014 | Park | ............... | G04C 3/002 |
| | | | | 345/156 |
| 9,197,082 B1* | 11/2015 | Zhang | ............... | G06F 19/3406 |
| 9,300,775 B1* | 3/2016 | Oh | ............... | H04M 1/0256 |
| 9,621,678 B1* | 4/2017 | Guastaferro | ............... | H04L 67/327 |
| 2002/0044058 A1* | 4/2002 | Heinrich | ............... | G06K 7/0008 |
| | | | | 340/572.1 |
| 2003/0046228 A1* | 3/2003 | Berney | ............... | G06F 21/32 |
| | | | | 705/41 |
| 2013/0073859 A1* | 3/2013 | Carlson | ............... | H04L 63/123 |
| | | | | 713/176 |

(Continued)

FOREIGN PATENT DOCUMENTS

| | | |
|---|---|---|
| CN | 203988014 U | 12/2014 |
| TW | M478960 U | 5/2014 |
| TW | 201501692 A | 1/2015 |

*Primary Examiner* — Kambiz Zand
*Assistant Examiner* — Tongoc Tran
(74) *Attorney, Agent, or Firm* — Rabin & Berdo, P.C.

(57) ABSTRACT

A wrist worn RFID device with security protection includes a wrist worn body, a control circuit, a sensing circuit, a safety circuit, a RFID module and a processing circuit. When the control circuit detects that two connecting ends of the control circuit are electrically conducted due to two combined portions of the wrist worn body are fastened together, an enable signal is generated. The processing circuit controls the sensing circuit and the safety circuit according to the enable signal. When detecting the physiological signal, the sensing circuit generates a first validation signal. When the inputted user information is accepted by the identity verification program, the safety circuit generates a second validation signal. The processing circuit generates a control signal according to the first validation signal and the second validation signal, so that the RFID module implements a wireless transmission based on the control signal.

19 Claims, 6 Drawing Sheets

(56) References Cited

U.S. PATENT DOCUMENTS

| | | | |
|---|---|---|---|
| 2013/0107674 A1* | 5/2013 | Gossweiler, III | G04G 17/06 368/10 |
| 2013/0286018 A1* | 10/2013 | Freyhult | G09G 5/393 345/428 |
| 2014/0176422 A1* | 6/2014 | Brumback | A61B 5/0015 345/156 |
| 2015/0062520 A1* | 3/2015 | Matsumori | G02F 1/133723 349/135 |
| 2015/0085623 A1* | 3/2015 | Modaragamage | A44C 5/24 368/10 |
| 2015/0109106 A1* | 4/2015 | Gomez | G06K 19/0723 340/10.1 |
| 2015/0186609 A1* | 7/2015 | Utter, II | A61B 5/0022 600/301 |
| 2015/0206044 A1* | 7/2015 | Nitta | G06K 19/07762 235/492 |
| 2015/0238150 A1* | 8/2015 | Subramaniam | H04Q 9/00 340/539.11 |
| 2016/0025766 A1* | 1/2016 | Hong | G01C 22/006 702/141 |
| 2016/0066842 A1* | 3/2016 | Kokkoneva | A61B 5/6885 600/479 |
| 2016/0139631 A1* | 5/2016 | Korkala | A61B 5/6824 345/174 |
| 2016/0157735 A1* | 6/2016 | Zhang | A61B 5/02055 600/301 |
| 2016/0246454 A1* | 8/2016 | Vonshak | G06F 3/0482 |
| 2016/0378963 A1* | 12/2016 | Anderson | G06F 21/32 726/19 |
| 2017/0132608 A1* | 5/2017 | Jardany | G06Q 20/3278 |

* cited by examiner

WRIST WORN RFID DEVICE WITH SECURITY PROTECTION AND METHOD THEREOF

BACKGROUND

Technical Field

The instant disclosure relates to the radio frequency identification (RFID) device, in particular, to a wrist worn RFID device with security protection and a method for security protection of a wrist worn RFID device.

Related Art

The radio frequency identification (hereinafter referred to RFID) technology has the advantage of identifying objects and reading/writing the related data through wireless signal without establishing the mechanical or optical contact between the identification system and the specific objects. At present, the applications of RFID technology have been applied in people's daily life.

Generally, the RFID technology falls into contact type and non-contact type. The sensing elements for non-contact RFID technology have become the mainstream because of its convenience.

Conventionally, the sensing elements of non-contact RFID technology are usually made in a rectangular recognition card for users to store it in the wallet or pocket. When using the recognition card for depositing, debiting, unlocking, etc, the users have to take out the recognition card from the wallet or the pocket and then put it on a sensing area to carry out those actions.

In addition, when the users use the conventional recognition card of non-contact RFID technology, no identity recognition is required. Once the conventional recognition card is lost, unauthorized usage may occur.

SUMMARY

In one embodiment of the present disclosure, a wrist worn RFID device with security protection comprises a wrist worn body, a control circuit, a sensing circuit, a safety circuit, a RFID module, and a processing circuit. The wrist worn body comprises a strap body, a first combined portion, and a second combined portion. The first combined portion and the second combined portion are disposed on two ends of the strap body. When the first combined portion and the second combined portion are fastened together detachably, the wrist worn body is in the shape of a ring. The control circuit comprises a first connecting end and a second connecting end. The first connecting end is connected to the first combined portion, and the second connecting end is connected to the second combined portion. The first connecting end is electrically connected with the second connecting end when the first combined portion is fastened to the second combined portion. When the control circuit detects that the first connecting end is electrically connected with the second connecting end, the control circuit generates an enable signal. When the first connecting end is electrically connected with the second connecting end, the sensing circuit detects a physiological signal of a user. When detecting the physiological signal, the sensing circuit generates a first validation signal. Furthermore, when the first connecting end is electrically connected to the second connecting end, the safety circuit receives a user information inputted by the user through a user interface to implement an identity verification program. When the inputted user information is accepted by the identity verification program, the safety circuit generates a second validation signal. The RFID module implements a wireless transmission according to a control signal. The processing circuit is electrically connected to the control circuit, the sensing circuit, the safety circuit, and the RFID module. The processing circuit controls the operations of the sensing circuit and the safety circuit according to the enable signal, and the processing circuit generates the control signal according to the first validation signal and the second validation signal.

In one embodiment of the present disclosure, the method for security protection of a wrist worn RFID device comprises detecting whether two electrical contacts, disposed on two ends of a wrist worn RFID device, are electrically connected together by a control circuit, when the wrist worn RFID device is at a wearing state, the electrical contacts connect to each other. The method also comprises implementing a wireless transmission procedure by a processing circuit when the electricity between the electrical contacts is conducted. The wireless transmission procedure comprises: detecting a physiological signal through a sensing surface located on the wrist worn RFID device by a sensing circuit; generating a first validation signal by the sensing circuit when detecting the physiological signal; implementing an identity verification program through a user interface located on the wrist worn RFID device; generating a second validation signal through a safety circuit when an inputted user information is accepted by the identity verification program; and generating a control signal according to the first validation signal and the second validation signal by the processing circuit for a RFID module of the wrist worn RFID device to implement a wireless transmission.

In summary, the features of the wrist worn RFID device with security protection and the method for security protection of a wrist worn RFID device according to one embodiment can determine whether first combined portion and the second combined portion are fasten together or not by detecting whether the first connecting end and the second connecting end are electrically connected to each other. The wrist worn RFID device can determine whether the user wears the wrist worn body in a standard environment by detecting the physiological signal. And, the wrist worn RFID device can confirm whether the inputted user information is consistent with the identity information and then activate the wireless transmission function of the wrist worn RFID device to let the user implement the wireless transmission. Thus, the safety and the convenience of the wrist worn RFID device can be more improved.

The following detailed description illustrates the features and advantages of the present disclosure, the content of detailed description is sufficient to enable the person skilled in the art to understand the contents of the present disclosure and to practice said disclosure. According to the contents, the claims and the drawings of the present disclosure, the person skilled in the art can easily understand the purposes and advantages of the present disclosure

DETAILED DESCRIPTION

Figure 1:
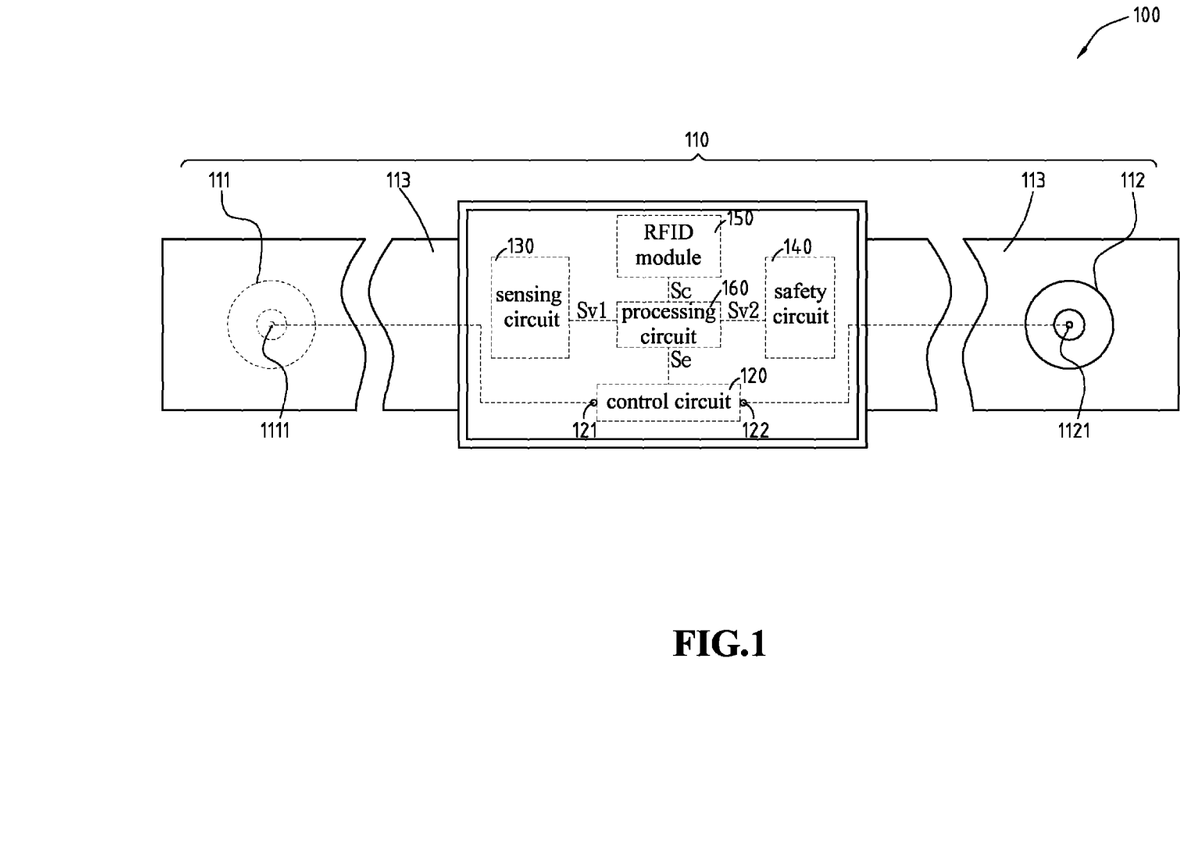
FIG. 1 illustrates a schematic diagram of a wrist worn RFID device with security protection according to an embodiment of the instant disclosure.

FIG. 1 illustrates a schematic diagram of a wrist worn RFID device with security protection according to an embodiment of the instant disclosure. Please refer to FIG. 1. The wrist worn RFID device 100 with security protection mainly comprises a wrist worn body 110, a control circuit 120, a sensing circuit 130, a safety circuit 140, a RFID module 150, and a processing circuit 160.

The wrist worn body 110 comprises a strap body 113, a first combined portion 111, and a second combined portion 112. The first combined portion 111 and the second combined portion 112 are disposed on two ends of the strap body 113. The control circuit 130 comprises a first connecting end 121 and a second connecting end 122. The first connecting end 121 and the second connecting end 122 are connected to the first combined portion 111 and the second combined portion 112 respectively so that an enable signal Se can be generated according to the status that first combined portion 111 and the second combined portion 112 are fastened. The processing circuit 160 is electrically connected to the control circuit 120 to receive the enable signal Se from the control circuit 120. The processing circuit 160 is also electrically connected to the sensing circuit 130 and the safety circuit 140 to receive a first validation signal Sv1 from the sensing circuit 130 and a second validation signal Sv2 from the safety circuit 140, and then generates a control signal Sc according to the first validation signal Sv1 and the second validation signal Sv2. The RFID module 150 is electrically connected to the processing circuit 160 to receive the control signal Sc from the processing circuit 160 and implements a wireless transmission according the control signal Sc.

Figure 2:
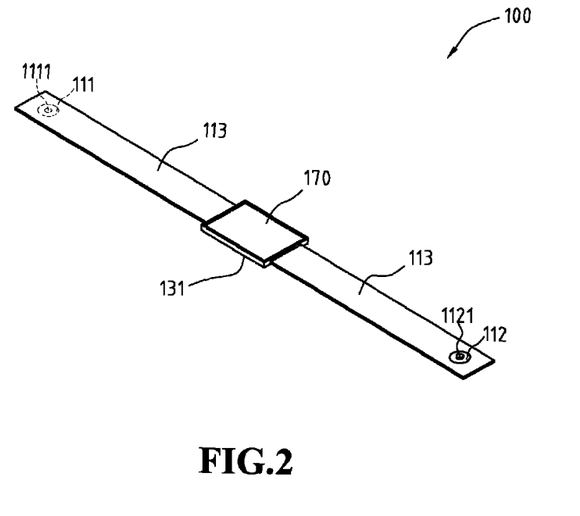
FIG. 2 illustrates a perspective schematic diagram of a wrist worn RFID device with security protection according to an embodiment of the instant disclosure.
Figure 3:
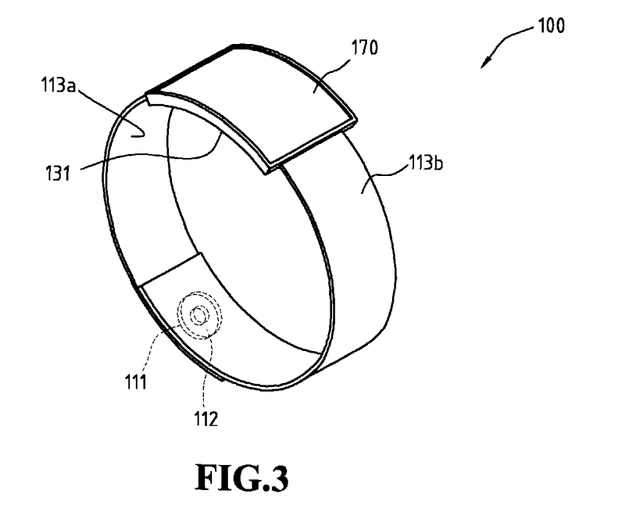
FIG. 3 illustrates a schematic diagram of a fastened wrist worn RFID device with security protection according to an embodiment of the instant disclosure.

FIG. 2 illustrates a perspective schematic diagram of a wrist worn RFID device with security protection according to an embodiment of the instant disclosure. FIG. 3 illustrates a schematic diagram of a fastened wrist worn RFID device with security protection according to an embodiment of the instant disclosure. Please refer to FIGS. 2 and 3. The wrist worn body 110 comprises the first combined portion 111 and the second combined portion 112, and the strap body 113. The first combined portion 111 and the second combined portion 112 are disposed on two ends of the strap body 113 and can be connected to each other. When the first combined portion 111 and the second combined portion 112 are fastened together detachably, the wrist worn body is in the shape of a ring to surround the user's wrist.

Figure 4:
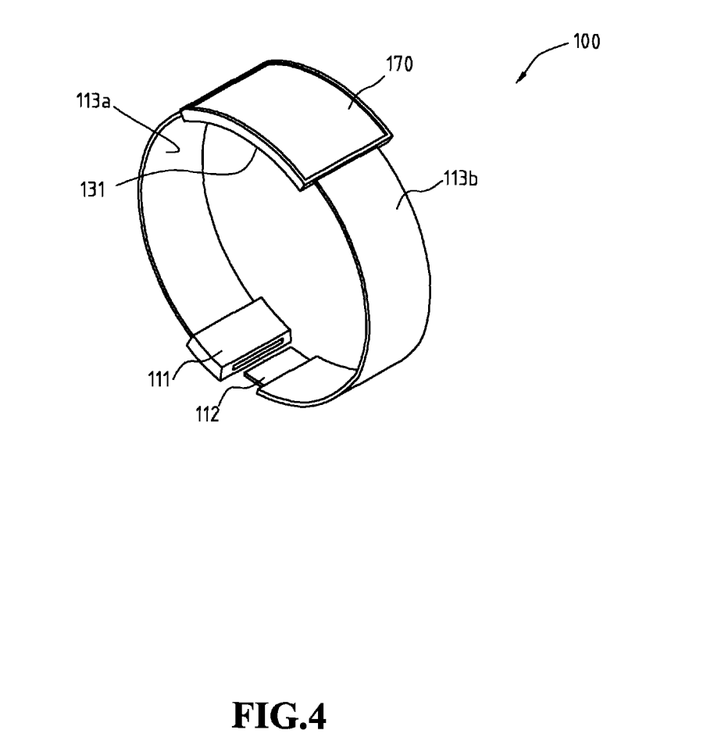
FIG. 4 illustrates a perspective schematic diagram of a wrist worn RFID device with security protection according to another embodiment of the instant disclosure.

In some embodiment, the first combined portion 111 has a recess, and the second combined portion 112 has a bulge member correspondingly. The recess of the first combined portion 111 can be combined with the bulge of the second combined portion 112. The first combined portion 111 and the second combined portion 112 are disposed on the inner surface and the outer surface of the strap body 113 respectively. The first combined portion 111 is combined with the second combined portion 112 by a snap-fit connection. In practice, the first combined portion 111 and the second combined portion 112 are magnetic locks so that they can be combined with each other magnetically. However, the present disclosure is not limited thereto. FIG. 4 illustrates a perspective schematic diagram of a wrist worn RFID device with security protection according to another embodiment of the instant disclosure. Please refer to FIG. 4. The first combined portion 111 and the second combined portion 112 can be engaged to each other by using general buckles. The first combined portion 111, the strap body 113 and the second combined portion 112 are connected sequentially, and the recess of the first combined portion 111 and the bulge of the second combined portion 112 can be engaged to each other by buckles so that the wrist worn body is in the shape of the ring to surround the user's wrist.

Figure 5:
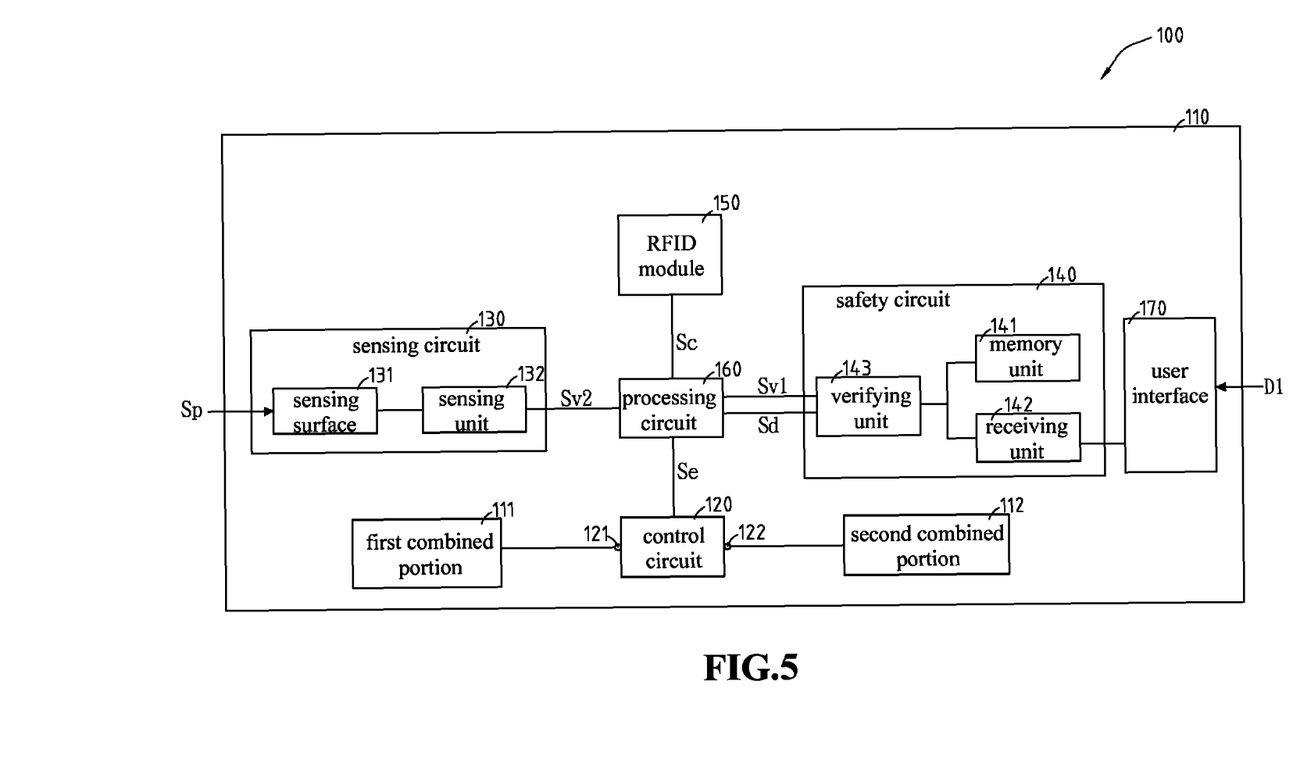
FIG. 5 illustrates a functional block diagram of a wrist worn RFID device with security protection according to an embodiment of the instant disclosure.

FIG. 5 illustrates a functional block diagram of a wrist worn RFID device with security protection according to an embodiment of the instant disclosure. Please refer to FIGS. 1 to 5. The control circuit 120 is embedded in the strap body 113, and the first connecting end 121 and the second connecting end 122 are connected to the first combined portion 111 and the second combined portion 112 respectively.

In this embodiment, the first combined portion 111 of the wrist worn body 110 has a first electrical contact 1111, and the first electrical contact 1111 is electrically connected to the first connecting end 121 of the control circuit 120 through conducting wires. The second combined portion 112 of the wrist worn body 110 has a second electrical contact 1121, and the second electrical contact 1121 is electrically connected to the second connecting end 122 of the control circuit 120 through conducting wires. When the first combined portion 111 is integrated with the second combined portion 112, the first electrical contact 1111 of the first combined portion 111 contacts with the second electrical contact 1121 of the second electrical contact 1121 so that the first combined portion 111 is electrically connected with the second combined portion 112 through the first electrical contact 1111 and the second electrical contact 1121. Therefore, the first connecting end 121 of the control circuit 120 can be electrically connected to the second connecting end 122 through the first combined portion 111 and the second combined portion 112 to form a conductive ring circuit.

Furthermore, when the control circuit 120 detects the first connecting end 121 and the second connecting end 122 are electrically connected, the control circuit 120 generates the enable signal Se so that the processing circuit 160 controls the operation of the sensing circuit 130 and the safety circuit 140 according to the enable signal Se.

In some embodiments, the first electrical contact 1111 is the conductive layer electroplated on the recess of the first combined portion 111, and the conductive layer (namely the first electrical contact 1111) is electrically connected to the first connecting end 121 through conducting wires. The second electrical contact 1121 is the conductive layer electroplated on the bulge of the second combined portion 112, and the conductive layer (namely the second electrical contact 1121) is electrically connected to the second connecting end 121 through conducting wires. When the first combined portion 111 is combined with the second combined portion 112 by a snap-fit connection, the first connecting end 121 can be electrically connected to the second connecting end 122. However, the present disclosure is not limited thereto.

In some embodiments, the control circuit 120 is using an integrated circuit (IC) to achieve the above-mentioned function, whereas the first connecting end 121 and the second connecting end 122 are pins of the integrated circuit.

The sensing circuit 130 comprises a sensing surface 131 and a sensing unit 132. The sensing surface 131 is disposed on the inner surface 113a of the strap body 113 to be close to or directly contact with the skin of the user in order to detect the physiological signal Sp of the user in a physiological validation program. In some embodiments, the physiological signal Sp comprises use's heartbeat signal, and temperature signal.

The sensing unit 132 is embedded in the strap body 113 and is electrically connected to the sensing surface 131 so as to generate the first validation signal Sv1 when detecting user's physiological signal Sp. Moreover, the sensing unit 132 is electrically connected to the processing circuit 160 so as to output the first validation signal Sv1 to the processing circuit 160 after the result of a physiological validation program is accepted (namely, after detecting user's physiological signal Sp).

The sensing circuit 130 generates the first validation signal Sv1 only after detecting user's physiological signal Sp. If the sensing circuit 130 does not detect user's physiological signal Sp, the sensing circuit 130 does not generate the first validation signal Sv1 so that the processing circuit 160 cannot generate the control signal Sc. Therefore, the wrist worn RFID device 100 according to one embodiment of the instant disclosure can detect whether the user wears the wrist worn body 110 on the wrist through the sensing circuit 130 to ensure that the user uses the wrist worn body 110 in a standard environment. The standard environment means that the user uses the wrist worn body 110 properly.

In some embodiments, the sensing circuit 130 detects the user's physiological signal Sp constantly. Namely, even though the sensing circuit 130 detects user's physiological signal Sp and generates the first validation signal Sv1, the sensing circuit 130 still detects the user's physiological signal Sp constantly to ensure that the user still wear the wrist worn body 110 and does not take it off after the sensing circuit 130 detected the physiological signal Sp. However, the present disclosure is not limited thereto. In other embodiment, after the sensing circuit 130 detects user's physiological signal Sp and generates the first validation signal Sv1, the sensing circuit 130 stop detecting the physiological signal Sp for a period of time in order to save power.

The safety circuit 140 is embedded in the strap body 113 and is electrically connected to the processing circuit 160 and the user interface 170. The user interface 170 is disposed on the outer surface 113b to facilitate the user inputs the user information D1 through the user interface 170. In some embodiments, the user interface 170 can be a touch screen or a non-touch screen with input buttons.

The safety circuit 140 comprises a memory unit 141, a receiving unit 142, and verifying unit 143. The receiving unit 142 is electrically connected to the user interface 170 to receive the user information D1 inputted from the user interface 170. The memory unit 141 stores the identity verification program and an identity information. The verifying unit 143 is electrically connected to the memory unit 141 and the receiving unit 142 to retrieve and then compare the identity information stored in the memory unit 141 and the inputted user information D1 stored in the receiving unit 142.

When the control circuit 120 detects that the first connecting end 121 is electrically connected with the second connecting end 122, the processing circuit 160 controls the sensing circuit 140 to implement the identity verification program store in the memory unit 141 to recognize the user's identity according to the enable signal Se generated from the control circuit 120. The receiving unit 142 receives the user information DI inputted by the user and then transmits the inputted user information DI to the verifying unit 143 for comparing whether the inputted user information DI inputted by the user is consistent with the identity information stored in the memory unit 141 so as to determine whether the result of the identity verification program is accepted or not. Then, when the inputted user information DI is consistent with the identity information, the verifying unit 143 generates the second validation signal Sv2.

In some embodiments, the identity information stored in the memory unit 141 can comprises the fingerprint data pre-inputted by the all users of the wrist worn RFID device 100, pre-set secret code and so on. Moreover, the identity information can use biometric feature, such as iris, voice, face and so on. Therefore, according to the type of the identity information, the verifying unit 143 of the safety circuit 140 can require the receiving unit 142 read the corresponding type of the inputted user information DI.

When the verifying unit 143 of the safety circuit 140 determines that the inputted user information DI is consistent with the identity information (namely, the inputted user information is accepted by the identity verification program), the verifying unit 143 generates the second validation signal Sv2. Otherwise, when the verifying unit 143 of the safety circuit 140 determines that the inputted user information DI is not consistent with the identity information (namely, the inputted user information is unaccepted by the identity verification program), the verifying unit 143 does not generate the second validation signal Sv2 so that the processing circuit 160 cannot generate the control signal Sc.

In some embodiments, the first combined portion 111 and the second combined portion 112 of the wrist worn body 110 are electronically controlled magnetic locks. When the inputted user information is unaccepted by the identity verification program, the safety circuit 140 generates a disable signal Sd to the processing circuit 160 so that the processing circuit 160 can change the electricity between the first connecting end 121 and the second connecting end 122 of the control circuit 120 from electrically conductive state into electrically non-conductive state according the disable signal Sd. Therefore, the first combined portion 111 and the second combined portion 112 are separated by demagnetization.

The identity verification program and the step of detecting the physiological signal Sp are implemented at the same time respectively. However, the present disclosure is not limited thereto. In other embodiments, the identity verification program can be implemented for recognizing the user's identity after the sensing circuit 130 detects the physiological signal Sp and generates the first validation signal Sv1.

The processing circuit 160 is electrically connected to the control circuit 120, the sensing circuit 130, and the safety circuit to control the sensing circuit 130 to detect the physiological signal Sp and the safety circuit 140 to implement the identity verification program according to the enable signal Se generated from the control circuit 120 respectively. Then, the processing circuit 160 generates the control signal Sc according to the first validation signal Sv1 generated from the sensing circuit 130 and the second validation signal Sv2 generated from the safety circuit 140.

In some embodiments, the processing circuit 160 and the control circuit 120 can use the same integrated circuit (IC) to implement their function.

The RFID module 150 is electrically connected to the processing circuit 160 to receive the control signal Sc from the processing circuit 160 and implements a wireless transmission according the control signal Sc.

In some embodiments, the RFID module 150 is also electrically connected to the user interface 170 so that implemented wireless transmission is switched to different types by the RFID module according to a switch message received by the user interface 170.

According to the above, only when the sensing circuit 130 detects the physiological signal Sp and generates the first validation signal Sv1 accordingly, and when the safety circuit 140 determines that the inputted user information is accepted by the identity verification program and generates the second validation signal Sv2 accordingly, the processing circuit 160 will generate the control signal Sc according to the first validation signal Sv1 and the second validation signal Sv2. As a result, the RFID module 150 implements a wireless transmission according the control signal Sc, and the user can make use of the wireless transmission function of the RFID module 150 to implement the wireless transmission. Therefore, the user can ensure that the wrist worn RFID device 100 is used in a standard and safe environment without being used by unauthorized user.

In one embodiment, the wrist worn RFID device 100 implements the physiological validation program and the identity verification program before every wireless transmission. In other words, after implementing the first wireless transmission by making use of the wireless transmission function of the RFID module 150, if the RFID module 150 is required to implement the second wireless transmission, the sensing circuit 130 will firstly implement the physiological validation program and the safety circuit 140 will implement the identity verification program again. Therefore, the safety of the wrist worn RFID device 100 can be further ensured. For example, after the RFID module 150 implements every wireless transmission, the processing circuit 160 stops generating the control signal Sc and detects whether the RFID module 150 implements next wireless transmission. If the processing circuit 160 detects that the RFID module 150 is required to implement next wireless transmission, it will firstly cause the sensing circuit 130 to sense the physiological signal Sp again and cause the safety circuit 140 to implement the identity verification program again and generate the control signal Sc again.

In another embodiment, when the wireless transmission function of the wrist worn RFID device 100 is activated, the user can implement the wireless transmission with unlimited times and need not implement the physiological validation program and/or the identity verification program again, until the user separates the first combined portion 111 and the second combined portion 112. If the first combined portion 111 and the second combined portion 112 are separated and then fastened together, the wireless transmission function of the wrist worn RFID device 100 will be activated again so that user can implement the wireless transmission.

Figure 6:
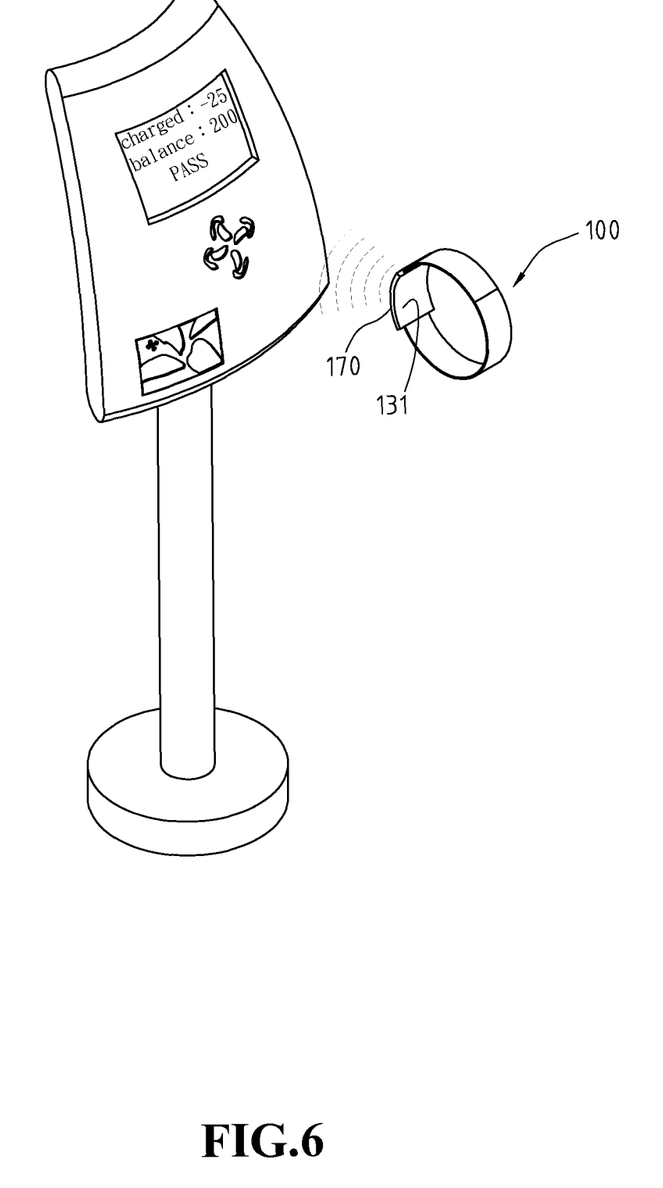
FIG. 6 is a use state diagram of a wrist worn RFID device with security protection according to an embodiment of the instant disclosure.

FIG. 6 is a usage scenario diagram of a wrist worn RFID device with security protection according to an embodiment of the instant disclosure. Please refer to FIG. 6. After the user wears the wrist worn RFID device 100 on the wrist, a wireless transmission procedure is implemented. The wireless transmission procedure includes the following steps: detecting the physiological signal Sp through the sensing surface 131 located on the wrist worn RFID device 100 by the sensing circuit 130; generating the first validation signal Sv1 by the sensing circuit 130 when detecting the physiological signal Sp; implementing the identity verification program through the user interface 170 located on the wrist worn RFID device 100; generating the second validation signal Sv2 through safety circuit 140 when the inputted user information DI is accepted by the identity verification program; and generating the control signal according to the first validation signal Sv1 and the second validation signal Sv2 by the processing circuit 160 for the RFID module 150 of the wrist worn RFID device 100 to implement a wireless transmission. If the results of the physiological validation program and the identity verification program are accepted, then the user can implement the wireless transmission by making use of the wireless transmission function of the wrist worn RFID device 100. The wrist worn RFID device 100 used for small payment is merely provided for illustration, without any intention to be used for limiting the instant disclosure. The user can use the wrist worn RFID device 100 to implement other applications of wireless transmission, such as depositing, debiting, unlocking, etc. Or, the wrist worn RFID device 100 can be used to identify the specific tags attached to objects or device, such as phone, computer, and so on. Or, the wrist worn RFID device 100 can be used to turn on smart home equipments, such as television, air conditioning equipment, light, computer, audio electronic, and so on. Accordingly, the wireless transmission implemented by the RFID module 150 of the wrist worn RFID device 100 can transmit and receive a debiting, depositing, or unlocking signal etc. In an embodiment, all kinds of radio frequency identification information can be integrated on the wrist worn RFID device 100 so as to facilitate the user implementing various wireless transmissions through wearing the wrist worn RFID device 100.

Figure 7:
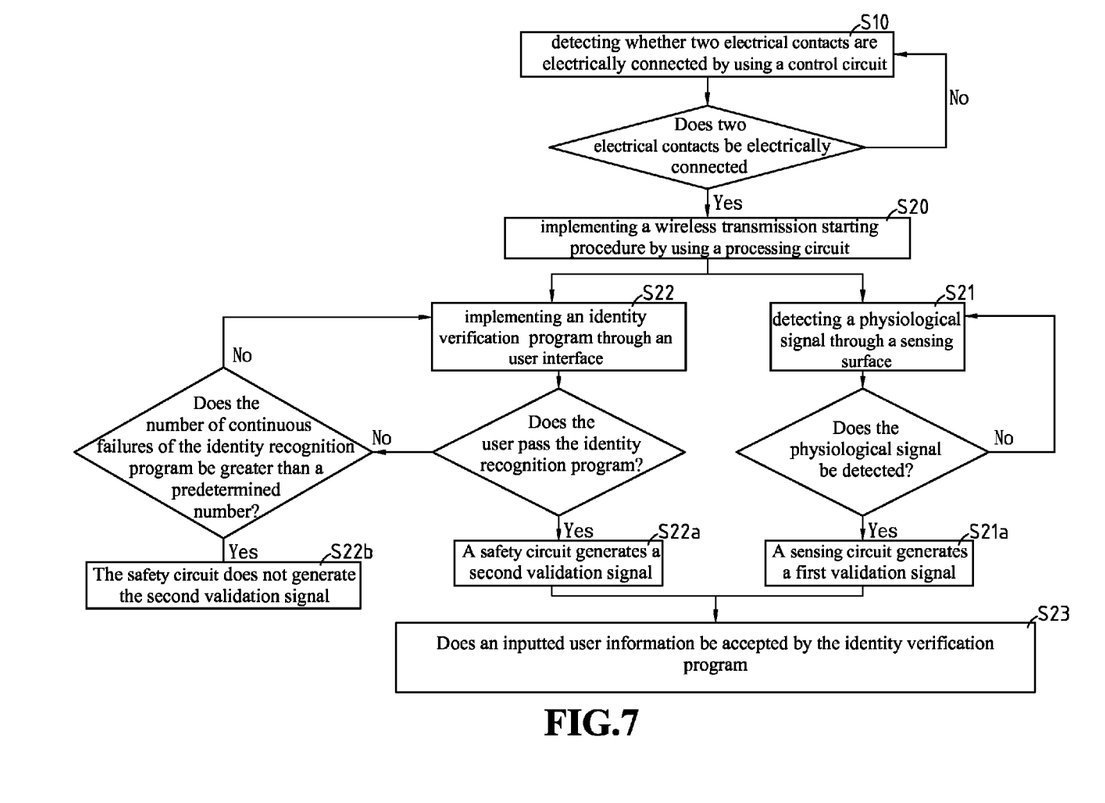
FIG. 7 is a flow chart illustrating a method for security protection of a wrist worn RFID device.

FIG. 7 is a flow chart illustrating a method for security protection of a wrist worn RFID device. Please refer to FIG. 7. A method for security protection of the wrist worn RFID device 100 comprises the step of detecting whether two electrical contacts are electrically connected by using a control circuit (step S10) and the step of implementing a wireless transmission starting procedure by using the processing circuit 160 when the electricity between the electrical contacts is conducted (step S20). A wireless transmission starting procedure implemented by the processing circuit 160 comprises detecting the physiological signal Sp through the sensing surface 131 (step S21), generating the first validation signal Sv1 by using the sensing circuit 130 when detecting the physiological signal Sp (step S21a), implementing the identity verification program through the user interface 170 (step S22), generating the second validation signal Sv2 through the safety circuit 140 when the inputted user information is accepted by the identity verification program (step S22a), and generating the control signal Sc according to the first validation signal Sv1 and the second validation signal Sv2 by using the processing circuit 160 so that the RFID module 150 implements the wireless transmission based on the control signal (step S23).

Accordingly, these two electrical contacts (namely, the first electrical contact 1111 and the second electrical contact 1121) are disposed on two ends of the wrist worn RFID device 100 respectively. When two ends of the wrist worn RFID device 100 are combined so that the wrist worn RFID device 100 is at a wearing state, the first electrical contact 1111 and the second electrical contact 1121 connect to each other to facilitate the first electrical contact 1111 being electrically connected to the second electrical contact 1121.

In the step 10, the wrist worn RFID device 100 can detect whether the first electrical contact 1111 and the second electrical contact 1121 are electrically connected by using the control circuit 120 to determine whether these two ends of the wrist worn RFID device 100 are combined to form the wearing state.

When the control circuit 120 detects the electricity between the first electrical contact 1111 and the second electrical contact 1121 is conducted, the wrist worn RFID device 100 carries out the step 20 to implement the wireless transmission starting procedure by using the processing circuit 160 so as to start using the wireless transmission function of the wrist worn RFID device 100.

In some embodiments, the steps S21 and S22 in the wireless transmission starting procedure are synchronized. However, the present disclosure is not limited thereto. Namely, the step S22 can be carried out sequentially after the steps S21 and S21a are finished.

In the step S21, the wrist worn RFID device 100 detects the physiological signal Sp through the sensing surface 131 located on the wrist worn RFID device 100. Thus, the wrist worn RFID device 100 can detect whether the user wears the wrist worn body 110 on the wrist for using to ensure that the user uses the wrist worn body 110 in the standard environment.

When the sensing surface 131 of the wrist worn RFID device 100 detects the user's physiological signal Sp, the step S21a can be carried out sequentially. Conversely, if the sensing surface 131 of the wrist worn RFID device 100 does not detect the user's physiological signal Sp, the step S21 will be carried out again.

In the step S21a, the sensing circuit 130 of the wrist worn RFID device 100 generates the first validation signal Sv1 according to the physiological signal Sp detected by the sensing surface 131. Thus, only if the sensing surface 131 detects the user's physiological signal Sp, the wrist worn RFID device 100 carries out the step S21a to generate the first validation signal Sv1 through the sensing circuit 130. Namely, if the the sensing surface 131 does not detect the user's physiological signal Sp, the sensing circuit 130 of the wrist worn RFID device 100 will not generate the first validation signal Sv1.

In the step S22, the wrist worn RFID device 100 implement the identity verification program by inputting the user information D1 through the user interface 170 to verify the user of the wrist worn RFID device 100 is the owner of the wrist worn RFID device 100.

The steps of implementing the identity verification program comprises receiving the user information D1 inputted by the user through the receiving unit 142 of the wrist worn RFID device 100, retrieving an identity information stored in a memory unit 141 through the verifying unit 143, and then comparing whether the inputted user information D1 is consistent with the identity information to determine whether the inputted user information is accepted by the identity verification program or not.

When the verifying unit 143 of the wrist worn RFID device 100 determines the inputted user information D1 is consistent with the identity information so as to determine that the inputted user information is accepted by the identity verification program, the step S22a is carried out so as the sensing circuit 140 can generate the second validation signal Sv2. Conversely, if the verifying unit 143 determines the inputted user information D1 is not consistent with the identity information so as to determine that the inputted user information is unaccepted by the identity verification program, the step S22b is carried out to make the sensing circuit 140 not generating the second validation signal Sv2 so as to end the identity verification program. However, the present disclosure is not limited thereto. In some embodiments, when the inputted user information is unaccepted by the identity verification program, the wrist worn RFID device 100 will carry out the step S22 again to implement the identity verification program through the safety circuit 140 and request the user to input the user information D1 again. However, when the number of continuous failures of the identity verification program is greater than a predetermined number, the step S22b is carried out to make the sensing circuit 140 not generating the second validation signal Sv2 so as to end the identity verification program. For example, if the predetermined number are two, the wrist worn RFID device 100 will carry out the step S22b instead of carrying out the step S22 to end the identity verification program when the number of continuous failures of the identity verification program reached three times.

After finishing the steps S21a and S22a, the step S23 is carried out continuously for finishing the wireless transmission starting procedure. In the step S23, the wrist worn RFID device 100 generates the control signal Sc according to the first validation signal Sv1 and the second validation signal Sv2 through the processing circuit 160 so that the RFID module 150 can implement the wireless transmission.

Thus, only if the wrist worn RFID device 100 finishes the wireless transmission starting procedure completely, the wireless transmission function are allowed to be used so as the user can use the wrist worn RFID device 100 to implement the wireless transmission.

In one embodiment, every time when the wrist worn RFID device 100 implements wireless transmission, it is need to implement the physiological validation program and the identity verification program. In other words, after implementing the wireless transmission by making use of the wireless transmission function of the RFID module 150, if the safety circuit 140 detects that the RFID module 150 implements the wireless transmission again, the wrist worn RFID device 100 implements the step S21 and the follow-up steps so that the safety of the wrist worn RFID device 100 can be more ensured. For example, after the wrist worn RFID device 100 implements every wireless transmission, the processing circuit 160 stops generating the control signal Sc and detects whether the RFID module 150 implements next wireless transmission. If the processing circuit 160 detects that the RFID module 150 is required to implement next wireless transmission, the sensing circuit 130 will firstly sense the physiological signal Sp through the sensing surface 131 again (step S21) and the safety circuit 140 will firstly request the user to input the user information D1 again to implement the identity verification program (step S22). Thus, the processing circuit 160 can generate the control signal Sc again according to the later generated first validation signal Sv1 and the later generated second validation signal Sv2 (step S23).

In another embodiment, when the wireless transmission function of the wrist worn RFID device 100 is activated by implementing the wireless transmission starting procedure, the user can implement the wireless transmission with unlimited times and need not implement the physiological validation program.

The two ends of the wrist worn RFID device 100 can be separated by the user. When the user detaches the wrist worn RFID device 100 from the wrist so that the wrist worn RFID device 100 is changed from the wearing state to a non-wearing state, the first electrical contact 1111 and the second electrical contact 1121 do not connect to each other so that the electricity between the first electrical contact 1111 and the second electrical contact 1121 do not be conducted. Thus, the RFID module 150 stops implementing the wireless transmission. Namely, even if the wrist worn RFID device 100 implements the wireless transmission starting procedure completely and the wireless transmission function of the wrist worn RFID device 100 is activated, when the user separates the two ends of the wrist worn RFID device 100 and then the wireless transmission function of the wrist worn RFID 100 is stopped so that the user cannot implement the wireless transmission through the wrist worn RFID device 100

In summary, the features of the wrist worn RFID device with security protection and the method for security protection of a wrist worn RFID device according to one embodiment can determine whether first combined portion and the second combined portion are fasten together or not by detecting whether the first connecting end and the second connecting end are electrically connected to each other. The wrist worn RFID device can determine whether the user wears the wrist worn body in a standard environment by detecting the physiological signal. And, the wrist worn RFID device can confirm whether the inputted user information is consistent with the identity information and then activate the wireless transmission function of the wrist worn RFID device to let the user implement the wireless transmission. Thus, the safety and the convenience of the wrist worn RFID device can be more improved.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A wrist worn RFID device with security protection, comprising:
   a wrist worn body comprising a strap body, a first combined portion, and a second combined portion, the first combined portion and the second combined portion being disposed on two ends of the strap body, wherein when the first combined portion and the second combined portion being fastened together detachably, the wrist worn body is in a shape of a ring;
   a control circuit disposed on the strap body, the control circuit comprising a first connecting end and a second connecting end, the first connecting end being connected to the first combined portion, and the second connecting end being connected to the second combined portion, wherein the first connecting end is electrically connected with the second connecting end when the first combined portion is fastened to the second combined portion, wherein when the control circuit detects that the first connecting end is electrically connected with the second connecting end, the control circuit generates an enable signal;
   a sensing circuit, coupled to the control circuit, wherein when the first connecting end is electrically connected with the second connecting end, the sensing circuit detects a physiological signal of an user, wherein when detecting the physiological signal, the sensing circuit generates a first validation signal;
   a safety circuit, coupled to the control circuit, wherein when the first connecting end is electrically connected to the second connecting end, the safety circuit receives an user information inputted by the user through an user interface to implement an identity verification program, when the inputted user information is accepted by the identity verification program, the safety circuit generates a second validation signal;
   a RFID module, disposed at the wrist worn body, implementing a wireless transmission according to a control signal; and
   a processing circuit electrically connected to the control circuit, the sensing circuit, the safety circuit, and the RFID module, wherein the processing circuit controls the operation of the sensing circuit and the safety circuit according to the enable signal, and the processing circuit generates the control signal according to the first validation signal and the second validation signal;
   wherein the RFID device is at a wearing state when the first connecting end is electrically connected to the second connecting end, and the RFID device is at a non-wearing state when the first connecting end is electrically disconnected from the second connecting end, and the RFID module stops implementing the wireless transmission when the wrist worn RFID device is changed from the wearing state to the non-wearing state.

2. The wrist worn RFID device with security protection of claim 1, wherein the safety circuit, comprising:
   a memory unit, storing the identity verification program and an identity information;
   a receiving unit receiving the inputted user information inputted by the user; and
   a verifying unit comparing whether the inputted user information is consistent with the identity information, wherein when the inputted user information is consistent with the identity information, the verifying unit generates the second validation signal.

3. The wrist worn RFID device with security protection of claim 1, wherein the sensing circuit comprises a sensing surface disposed on the inner surface of the strap body to contact with the skin of the user in order to detect the physiological signal.

4. The wrist worn RFID device with security protection of claim 1, wherein when the sensing circuit does not detect the physiological signal, the sensing circuit does not generate the first validation signal so that the processing circuit does not generate the control signal.

5. The wrist worn RFID device with security protection of claim 1, wherein when the inputted user information is unaccepted by the identity verification program, the safety circuit does not generate the second validation signal so that the processing circuit does not generate the control signal.

6. The wrist worn RFID device with security protection of claim 1, wherein the first combined portion and the second combined portion are electronically controlled magnetic locks.

7. The wrist worn RFID device with security protection of claim 6, wherein when the inputted user information is unaccepted by the identity verification program, the safety circuit generates a disable signal to the processing circuit so that the first combined portion and the second combined portion are separated since the electricity between the first connecting end and the second connecting end are not conducted.

8. The wrist worn RFID device with security protection of claim 1, wherein the processing circuit detects whether the RFID module implements the wireless transmission again or not, and when the processing circuit detects that the RFID module is required to implement the wireless transmission again, the processing circuit causes the sensing circuit to detect the physiological signal of the user again.

9. The wrist worn RFID device with security protection of claim 1, wherein the first combined portion comprises a first electrical contact electrically connected to the first connecting end of the control circuit, and the second combined portion comprises a second electrical contact electrically connected to the second connecting end of the control circuit, when the first combined portion are fastened to the second combined portion, the first electrical contact are connected to the second connecting end so that the first connecting end are electrically connected to the second connecting end.

10. The wrist worn RFID device with security protection of claim 1, wherein the RFID module is electrically connected to the user interface and the implemented wireless transmission is switched to different types by the RFID module according to a switch message received by the user interface.

11. A method for security protection of a wrist worn RFID device, comprising:
 detecting whether two electrical contacts, disposed on two ends of a wrist worn RFID device, are electrically connected together by a control circuit, wherein when the wrist worn RFID device is at a wearing state, the electrical contacts connect to each other; and
 implementing a wireless transmission procedure by a processing circuit when the electricity between the electrical contacts is conducted, wherein the wireless transmission procedure comprises:
  detecting a physiological signal through a sensing surface located on the wrist worn RFID device by a sensing circuit;
  generating a first validation signal by the sensing circuit when detecting the physiological signal;
  implementing an identity verification program through a user interface located on the wrist worn RFID device;
  generating a second validation signal through a safety circuit when an inputted user information is accepted by the identity verification program; and
  generating a control signal according to the first validation signal and the second validation signal by the processing circuit for a RFID module of the wrist worn RFID device to implement a wireless transmission;
 wherein when the wrist worn RFID device is changed from the wearing state to a non-wearing state, the electrical contacts do not connect to each other and the RFID module stops implementing the wireless transmission.

12. The method for security protection of a wrist worn RFID device of claim 11, wherein the step of implementing the identity verification program through the user interface located on the wrist worn RFID device further comprising:
 receiving a user information inputted from the user interface;
 retrieving an identity information stored in a memory unit through a verifying unit; and
 comparing whether the inputted user information is consistent with the identity information through the verifying unit to determine whether the inputted user information is accepted by the identity verification program or not.

13. The method for security protection of a wrist worn RFID device of claim 11, further comprising:
 when the inputted user information is unaccepted by the identity verification program, implementing the identity verification program through the user interface again; and
 when the number of continuous failures of the identity verification program is greater than a predetermined number, the safety circuit does not generate the second validation signal.

14. The method for security protection of a wrist worn RFID device of claim 11, further comprising:
 when the sensing surface does not detect the physiological signal, the sensing circuit does not generate the first validation signal.

15. The method for security protection of a wrist worn RFID device of claim 12, further comprising:
 detecting whether the RFID module implements the wireless transmission again or not by the processing circuit; and
 when the RFID module is required to implement the wireless transmission again, detecting the physiological signal of the user again through the sensing surface located on the wrist worn RFID device.

16. The method for security protection of a wrist worn RFID device of claim 15, wherein the steps of the RFID module implementing the wireless transmission again comprising:
 implementing an identity verification program through the user interface located on the wrist worn RFID device again.

17. The method for security protection of a wrist worn RFID device of claim 11, further comprising:
 receiving a switch message by the user interface and switching the implemented wireless transmission to different types according to the switch message.

18. The method for security protection of a wrist worn RFID device of claim 11, further comprising:
 when the inputted user information is unaccepted by the identity verification program, the safety circuit does not generate the second validation signal.

19. The method for security protection of a wrist worn RFID device of claim 11, further comprising:
 when the inputted user information is unaccepted by the identity verification program, the safety circuit generates a disable signal so that the electricity between the electrical contacts are not conducted, the two electrical contacts are separated since the electricity between the two electrical contacts are not conducted.

* * * * *